United States Patent
Baumgaertner et al.

(10) Patent No.: US 12,459,600 B2
(45) Date of Patent: Nov. 4, 2025

(54) METHOD FOR OPERATING A VEHICLE OPERABLE BY MOTOR POWER AND/OR PEDAL POWER, AND VEHICLE

(71) Applicant: Robert Bosch GmbH, Stuttgart (DE)

(72) Inventors: Daniel Baumgaertner, Tuebingen (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 815 days.

(21) Appl. No.: 17/684,664

(22) Filed: Mar. 2, 2022

(65) Prior Publication Data

US 2022/0289334 A1    Sep. 15, 2022

(30) Foreign Application Priority Data

Mar. 9, 2021   (DE) .................... 10 2021 202 244.8

(51) Int. Cl.
*B62M 6/50*   (2010.01)
*B62J 45/411*  (2020.01)
*B62M 6/55*   (2010.01)

(52) U.S. Cl.
CPC .............. *B62M 6/50* (2013.01); *B62J 45/411* (2020.02); *B62M 6/55* (2013.01)

(58) Field of Classification Search
CPC ........... B62M 6/50; B62M 6/55; B62J 45/411

(Continued)

(56) References Cited

U.S. PATENT DOCUMENTS

2010/0168967 A1* 7/2010 Dlugoss ................ B60W 40/10
701/49
2014/0371989 A1* 12/2014 Trimboli ............... B60W 40/09
701/41

(Continued)

FOREIGN PATENT DOCUMENTS

CA          2836456 A1 *  6/2014  .............. B62M 6/45
DE    102014224066 A1     6/2016

(Continued)

OTHER PUBLICATIONS

Dasbach et al, Method for Sensorcheck of a Bicycle With Electric Drive and System Therefore, Aug. 30, 2017, EP 2566747 B1, Machine Translation of Full Patent Text (Year: 2017).*

(Continued)

*Primary Examiner* — Valentin Neacsu
(74) *Attorney, Agent, or Firm* — NORTON ROSE FULBRIGHT US LLP

(57) ABSTRACT

A method for operating a vehicle operable by motor power and/or pedal power, in particular, an electric bicycle. The vehicle includes an electric drive, a crank mechanism, at least one torque sensor, which is configured to detect a torque applied by a rider onto the crank mechanism, in the form of a multitude of torque measuring signals, and a control unit, which is configured to generate a control signal for activating the electric drive as a function of at least one of the torque measuring signals. Upon detection of an error regarding the torque sensor, the control signal is generated in the form of a substitute control signal, based on at least one of the torque measuring signals, when this at least one torque measuring signal is recognized as plausible. A vehicle operable by motor power and/or pedal power, in particular, an electric bicycle, is also described.

10 Claims, 4 Drawing Sheets

(58) Field of Classification Search
USPC .................................................... 180/206.3
See application file for complete search history.

(56) References Cited

U.S. PATENT DOCUMENTS

2016/0347406 A1* 12/2016 Tsuchizawa .............. B60L 7/10
2021/0122443 A1   4/2021 Yang et al.

FOREIGN PATENT DOCUMENTS

| EP | 2566747 B1 * | 8/2017 | ............ B60L 3/0038 |
| JP | 2017074813 A | 4/2017 | |
| JP | 2019206230 A * | 12/2019 | |

OTHER PUBLICATIONS

Fujiwara et al, Hands On-Off Detection Device, Electric Power Steering Device, External Torque Estimation Method, and Hands On-Off Detection Device Control Program, Dec. 5, 2019, JP 2019206230 A, Machine Translation of Claims and Description (Year: 2019).*

* cited by examiner

METHOD FOR OPERATING A VEHICLE OPERABLE BY MOTOR POWER AND/OR PEDAL POWER, AND VEHICLE

FIELD

The present invention relates to a method for operating a vehicle operable by motor power and/or pedal power, in particular, an electric bicycle, including an electric drive. The present invention furthermore relates to such a vehicle.

BACKGROUND INFORMATION

Methods for operating such a vehicle, in particular, an electric bicycle, are describe, for example, in German Patent Application No. DE 10 2014 224 066 A1.

SUMMARY

The present invention is directed to a method for operating a vehicle operable by motor power and/or pedal power, in particular, an electric bicycle, including an electric drive, a crank mechanism, at least one torque sensor, which is configured to detect a torque applied by a rider onto the crank mechanism, in particular, a rider torque, in the form of a multitude of torque measuring signals, and including a control unit, which is configured to generate a control signal for activating the electric drive as a function of at least one torque measuring signal.

The vehicle includes a crank mechanism which is typically connected to two cranks, at each of which a pedal is situated for receiving a power exerted by a rider of the vehicle. The crank mechanism, cranks, and pedals are used to convert the force exerted by the rider into a rider torque acting on the crank mechanism. The rider torque may be converted into an output torque, which acts on at least one wheel of the vehicle, for the propulsion of the vehicle. In one operating state, the vehicle, in particular, an electric bicycle, is at least partially driven with the aid of an electric drive, encompassing a motor. For this purpose, the rider torque is superimposed with a driving torque generated by the electric drive during the conversion into the output torque.

In the case of upscale vehicles, in particular, electric bicycles, torque sensors are typically used for detecting the rider torque. In the case of a support request by the rider, the detected rider torque is then proportionally intensified by the electric drive. The detection with the aid of the torque sensors results in a natural driving sensation for the rider since an increased introduction of a power simultaneously results in increased support, up to a maximum support.

According to an example embodiment of the present invention, the torque applied by a rider onto the crank mechanism, in particular, rider torque, is detected in the form of a multitude of torque measuring signals. In the process, the multitude of torque measuring signals represents at least two detection channels which are independent of one another and, in particular, detectable in parallel, for example implemented using two (or multiple) independently operating torque sensors or using one torque sensor including two (or multiple) independently outputtable detection channels. In the process, the independently operating torque sensors may be torque sensors of the same or a different type.

In accordance with an example embodiment of the present invention, the control unit is used to activate the functional components of the drive of the vehicle and is configured, i.e., interconnected and/or programmed, to generate a control signal for activating the electric drive as a function of at least one torque measuring signal provided by the at least one torque sensor, and to pass it on to the drive. It is possible that the control signal is generated as a function of one individual of the at least two torque measuring signals. As an alternative, it is possible that the control signal is generated as a function of a mean value of all or a selection of available torque measuring signals. The term "mean value" in this patent specification encompasses all forms of calculating or generating such a value, for example an arithmetic mean, a median and the like.

The control unit is furthermore configured to carry out the method according to the present invention for operating the vehicle, in particular, the electric bicycle. In accordance with an example embodiment of the present invention, The control unit is configured, upon the detection of an error regarding the at least one torque sensor, in particular, regarding at least one of the torque measuring signals provided by the at least one torque sensor, to generate the control signal in the form of a substitute control signal, based on at least one of the torque measuring signals, when this at least one torque measuring signal is recognized, i.e., evaluated, as plausible. It is possible that the substitute control signal is generated as a function of one individual of the multitude of torque measuring signals. As an alternative, it is possible that the substitute control signal is generated as a function of a mean value of all or a selection of available torque measuring signals. The above comments apply to the mean value.

In this way, considerable disadvantages of the related art may be overcome. Since, according to the related art, a torque measuring signal, which is provided using a torque sensor as a main sensor, is used for deriving a support by the drive, and thus assumes a safety-relevant role, the support by the electric drive is switched off when an error is detected regarding the torque sensor and/or regarding a torque measuring signal provided by the torque sensor. Depending on the actual implementation of the torque sensor, it is possible for numerous errors to occur, which, in turn, result in numerous interruptions in the support by the electric drive. A temporal drift of the torque measuring signals output by the torque sensor, a dependence of the torque measuring signals on external influences, such as temperature, magnetic fields or the like, or also intrinsic malfunctions of the torque sensor are possible here, for example. Such errors may, for example, result in an offset of torque measuring signals and/or in a low signal-to-noise ratio of torque measuring signals. In principle, it applies in the process that, with increased error proneness, which is typically accompanied by an increased sensitivity or response dynamics of a torque sensor, even brief disruptions, in particular, based on external influences, cause the drive to be switched off, and consequently the operation of the vehicle to be interrupted. Such errors as well as their recognition through the evaluation of a torque measuring signal are generally conventional in the related art.

It is possible, for example, that an error is detected when multiple torque measuring signals provided, in particular, in parallel, by the at least one torque sensor essentially deviate from one another. "Essentially deviating from one another" shall be understood to mean that the difference in the torque measuring signals, for example ascertained based on a spread or variance around a mean value and/or with the aid of a distance function (difference function), exceeds a predefined or predefinable threshold. During undisrupted operation, in contrast, essentially agreement exists between the torque measuring signals, it being possible, for example, to use one of the torque measuring signals or a mean value for generating the control signal.

The method according to an example embodiment of the present invention, in an improvement of the related art, allows such errors to be recognized and, as a function thereof, the electric drive to be activated, resorting to a substitute control signal, based on characteristic features in at least one of the torque measuring signals which are classified as plausible for a normal operation of the torque sensor. In this way, the failure of the drive of the vehicle is advantageously avoided. In particular, brief errors may be compensated for or bridged in this way. This intelligent monitoring of torque measuring signals and/or of the at least one torque sensor allows a substitute control signal to be used as a function of different case configurations.

In one specific embodiment of the method of the present invention, a mean value of the torque measuring signals is recognized as plausible, and the mean value, or one of the torque measuring signals used for forming the mean value, is used as the substitute control signals when this mean value regularly falls below a first threshold value S1. In this way, it is possible to recognize a safe state during the operation of the vehicle, despite an error being recognized. Based on the regular drop of the mean value below first threshold value S1, it may be inferred that a characteristic profile of the torque, in particular, of the rider torque, is present during pedaling, during which a sinusoidal profile results in correctly measured torque measuring signals, which has its minimum in the vicinity of the bottom dead center of a pedal revolution. A sine period is generated in the process per half pedal revolution. In this way, it is consequently easily possible to recognize the characteristic sinusoidal profile of the torque, in particular, of the rider torque. "Regularly" shall be understood to mean that a threshold value according to the sinusoidal shape of a torque measuring signal repeatedly falls below or exceeds a predefined threshold value, here S1. Assuming an ideal sinusoidal signal profile, a crossing of the threshold value occurs twice in the process (once upon falling below, once upon exceeding) during one period. In addition, further instances of exceedance and/or undershoot may occur and, in particular, be tolerated, which may occur due to sensor noise and/or surroundings conditions, such as vibrations. In one exemplary embodiment, first threshold value S1 may be selected to be 5 Nm. In principle, according to this specific embodiment of the present invention, one of the torque measuring signals, or also the mean value of the torque measuring signals itself, continues to be usable for ascertaining the substitute control signal.

In one specific embodiment of the method of the present invention, at least one of the torque measuring signals, in particular, the smallest of the torque measuring signals, is recognized as plausible and used as the substitute control signal when the signal regularly falls below a first threshold value S1. In this way, it may additionally be implemented to still recognize a safe state during operation of the vehicle, despite an error being recognized, when only one of the available torque measuring signals reflects a characteristic profile of the rider torque during pedaling. This torque measuring signal may be utilized as the substitute control signal. In particular, a particularly robust method having low failure rates may thus be implemented.

In one specific embodiment of the method of the present invention, at least one of the torque measuring signals, in particular, the smallest of the torque measuring signals, is recognized as plausible and used as the substitute control signal when the signal does not regularly fall below first threshold value S1, and regularly exceeds and falls below a second threshold value S2 (so-called "crossing"). In the process, second threshold value S2 is greater than first threshold value S1. In this way, it is possible to recognize a safe state during the operation of the vehicle, despite an error being recognized. Based on second threshold value S2 being regularly exceeded and fallen below, a characteristic profile of the rider torque may also be inferred during pedaling, in which the sinusoidal profile is subjected to a plausibility check based on threshold value S2 being exceeded/fallen below. In one exemplary embodiment of the present invention, the second threshold value may be selected to be 30 Nm. In particular, this specific embodiment is also suitable when even the smallest of the torque measuring signals does not fall below first threshold value S1. For example, such configurations are possible during an acceleration of the vehicle and/or during a driving operation including an uphill grade (uphill drive situation) and/or during a use of clipless pedals, in which a bottom dead center in the crank movement is shifted in the positive direction.

In the event that multiple torque measuring signals overlap, in particular, during a predefined time period, so that it is unclear which torque measuring signal is the smallest, it is possible to use the minimum of all torque measuring signals. As an alternative, it is possible to use the torque measuring signal having the lowest low point (minimum).

In one specific embodiment of the method of the present invention, a torque measuring signal is only recognized as plausible and used as the substitute control signal when, additionally, it has a periodicity ("periodicity criterion") with which it regularly exceeds and falls below first threshold value S1 and/or second threshold value S2, the periodicity essentially corresponding to a pedaling frequency of the rider. "Essentially corresponds" here shall be understood to mean that minor deviations, in particular, caused metrologically, of less than 20%, in particular, of less than 10%, most particularly of less than 5%, are negligible.

The periodicity of the pedaling frequency may be ascertained in a variety of ways, for example with the aid of a cadence sensor or from a rotational speed of the motor of the electric drive. In this way, one further variable which is characteristic of the expected signal profile—the number of instances of second threshold value S2 being exceeded and fallen below ("crossings")—is used for the plausibility check of the torque measuring signal/torque measuring signals to be utilized as the substitute control signal.

In one specific embodiment of the method of the present invention, a torque measuring signal is only recognized as plausible and used as the substitute control signal when it is recognized as being similar to a sinusoidal signal. "Similar" shall be understood to mean that a value, which indicates the similarity as a function of a predefined threshold, is calculated with the aid of mathematical methods, such as a correlation analysis, a frequency analysis, an analysis of a difference signal of the sinusoidal signal and the torque measuring signal, or the like. With the aid of a correlation method, it is possible to ascertain, for example, whether the torque measuring signal and the sinusoidal signal correlate, i.e., their signal sequences are essentially identical (i.e., similar). In particular, this may be implemented with the calculation of a correlation value. Based on the correlation value, the similarity of the torque measuring signal and the sinusoidal signal is established (for example, starting at a standardized correlation of greater than 0.5). A correlation value shall be understood to mean a value which describes the similarity of the two signals. This idea of the value characterizing the similarity, which is described here within the scope of a correlation method, may also be applied to a value describing the similarity of the two signals within the scope of an arbitrary pattern recognition method. For example, it is also possible to ascertain a covariance value between the torque measuring signal and the sinusoidal signal, and to detect a similarity of the torque measuring signal and the sinusoidal signal when the covariance value positively exceeds a threshold value.

In one specific embodiment of the method of the present invention, the exceedance and/or undershoot of threshold values (threshold value criterion) is ascertained during a predefined time period and/or in a predefined number of pedal revolutions (about the crank shaft) acting on the crank mechanism or permanently from at least one torque measuring signal. Furthermore, in one specific embodiment of the method, the periodicity (periodicity criterion) is ascertained during a predefined time period and/or in a predefined number of pedal revolutions (about the crank shaft) acting on the crank mechanism from the torque measuring signal. For example, it is possible to ascertain the undershoot and/or exceedance of threshold values and/or the periodicity during a time period of, in each case, 2 seconds, in particular, of, in each case, 1 second, most particularly of, in each case, 0.5 seconds. Furthermore, a pause may be possible between two such time periods. As an alternative or in addition, the undershoot and/or exceedance of threshold values and/or the periodicity may, for example, be ascertained in each case from two pedal revolutions, in particular, in each case from one pedal revolution, most particularly in each case from half a pedal revolution. It is furthermore possible to ascertain the undershoot and/or exceedance of threshold values and/or the periodicity as a function of a predefined distance from the torque measuring signal, for example, in each case, averaged over two wheel revolutions (approximately 5 meters), in particular, over one wheel revolution (approximately 2.2 meters), most particularly over a half a wheel revolution (approximately 1.1 meter). As an alternative, a permanent ascertainment of the undershoot and/or exceedance of threshold values and/or of the periodicity is possible.

Furthermore, it is possible that the "undershoot and/or exceedance of threshold values" (threshold value criterion) and/or "periodicity" (periodicity criterion) conditions must be met at predefined time intervals or distance intervals in order to still be able to classify the torque measuring signals to be used as plausible.

In one specific embodiment of the method of the present invention, first threshold value S1 and/or second threshold value S2 is/are designed with a hysteresis. In this way, a more robust detection of the undershoot and/or exceedance of threshold values may be implemented. In the case of an ideal sinusoidal profile of a torque measuring signal, an exceedance and an undershoot (i.e., two crossings) of a threshold value are expected in each case in a half pedal revolution. Since a torque measuring signal is typically noisy, the hysteresis of the threshold values makes it possible to minimize the influence of the noise during the detection of the undershoot and exceedance. It is possible, for example, to detect an exceedance of threshold value S2 of 30 Nm only in the event of a signal rise above 35 Nm, and to detect an undershoot only in the event of a signal drop below 25 Nm.

In one specific embodiment of the method of the present invention, threshold value S1 is selected as a value of the shut-off threshold of the electric drive. In this way, it is possible to directly monitor, with the aid of threshold value S1, whether it is still possible to arrive at a safe state using the torque measuring signal. In the safe state, the motor is shut off after a certain time, and the vehicle is not accelerated in an uncontrolled manner.

In one specific embodiment of the method of the present invention, a torque measuring signal is only recognized as plausible and used as the substitute control signal when it is recognized as plausible with the aid of a sensor signal of at least one further sensor, in particular, of the vehicle. For example, it is possible that a motor rotational speed sensor and/or a pedal rotational speed sensor is/are used for detecting the periodicity criterion, and thus is/are used as a further mechanism for the plausibility check of the substitute control signal.

In one specific embodiment of the method of the present invention, a torque threshold value Sm, starting at which the electric drive is switched on, is increased when resorting to the substitute control signal. In one alternative or additional specific embodiment of the method of the present invention, the driving torque generated by the electric drive (or its drive power) is reduced when the substitute control signal is resorted to. In this way, it may furthermore be achieved that an increased driving safety is obtained, despite resorting to a possibly erroneous torque measuring signal. It is furthermore possible to carry out an increase in torque threshold value Sm and/or a reduction in the driving torque as a function of a duration over which the substitute control signals is already being used. It is possible, for example, that one of these measures is carried out to further enhance the driving safety when using the substitute control signal longer than 1 minute, in particular, longer than 5 minutes, most particularly longer than 10 minutes. It is also possible to carry out a staggered increase in torque threshold value Sm and/or a staggered reduction in driving torque as a function of a duration.

It shall be noted that, in the event that no drive support and/or no setpoint driving torque and/or no actual driving torque is generated by the electric drive so that, consequently, also no risky driving situation originating from the drive is present, no error needs to be output, even in the absence of a plausibility check of a substitute control signal. Furthermore, upon detection of an uphill grade (for example with the aid of an inclination sensor of the vehicle), during which often also no risky driving situation is present since the vehicle is able to come to a halt more rapidly, the meeting of the plausibility criteria (threshold value criterion and/or periodicity criterion) may be designed more broadly.

In one specific embodiment of the method of the present invention, a calibration of the at least one torque sensor, as it is common during driving to compensate for a temporal drift of the torque sensor, is suspended while the substitute control signal is resorted to. In this way, a disadvantageous erroneous calibration may be avoided.

It shall furthermore be noted that, in the described method, all utilized torque measuring signals may be subjected to a preparation in signal terms, for example a filtering (mean value filtering, median filtering, etc.) or a smoothing.

Furthermore, a vehicle operable by motor power and/or pedal power, in particular, an electric bicycle, including an electric drive, a crank mechanism, at least one torque sensor, which is configured to detect a torque applied by a rider onto the crank mechanism, in the form of a multitude of torque measuring signals, and including a control unit is described, the control unit being configured to carry out one specific embodiment of the method according to the present invention.

BRIEF DESCRIPTION OF THE DRAWINGS

The present invention is described in greater detail in the following description based on exemplary embodiments shown in the figures. The figures and the description include numerous features in combination. Those skilled in the art will advantageously also consider the features individually and combine them into useful further combinations, in view of the disclosure herein. Identical reference numerals in the figures indicate identical elements.

DETAILED DESCRIPTION OF EXAMPLE EMBODIMENTS

Figure 1:
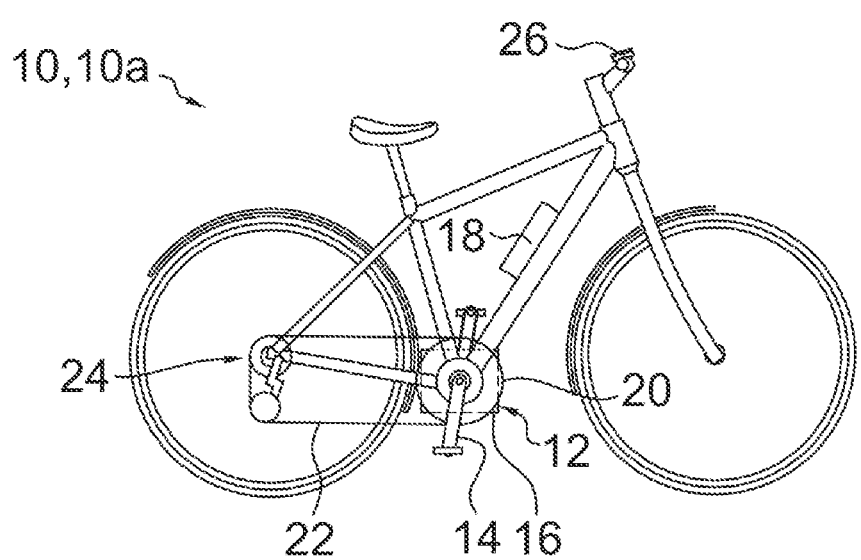
FIG. 1 shows a schematic view of a vehicle according to one exemplary embodiment of the present invention.

FIG. 1 shows an electric bicycle 10a as an exemplary embodiment of vehicle 10 according to the present invention. As is apparent from FIG. 1, electric bicycle 10a includes a crank mechanism 12 including two cranks 14 and an electric drive 16. A rechargeable battery, which is used to supply electric drive 16 with energy, is denoted by reference numeral 18. Furthermore, a chain ring 20 in which a chain 22 engages is provided at crank mechanism 12, so that an output torque may be transferred from chain ring 20 onto a pinion at a derailleur gear 24 at the rear wheel of electric bicycle 10a. Electric bicycle 10a furthermore includes a control unit 26. Control unit 26 is connected to electric drive 16 and is configured to control electric drive 16 according to one of the methods described hereafter.

Figure 2:
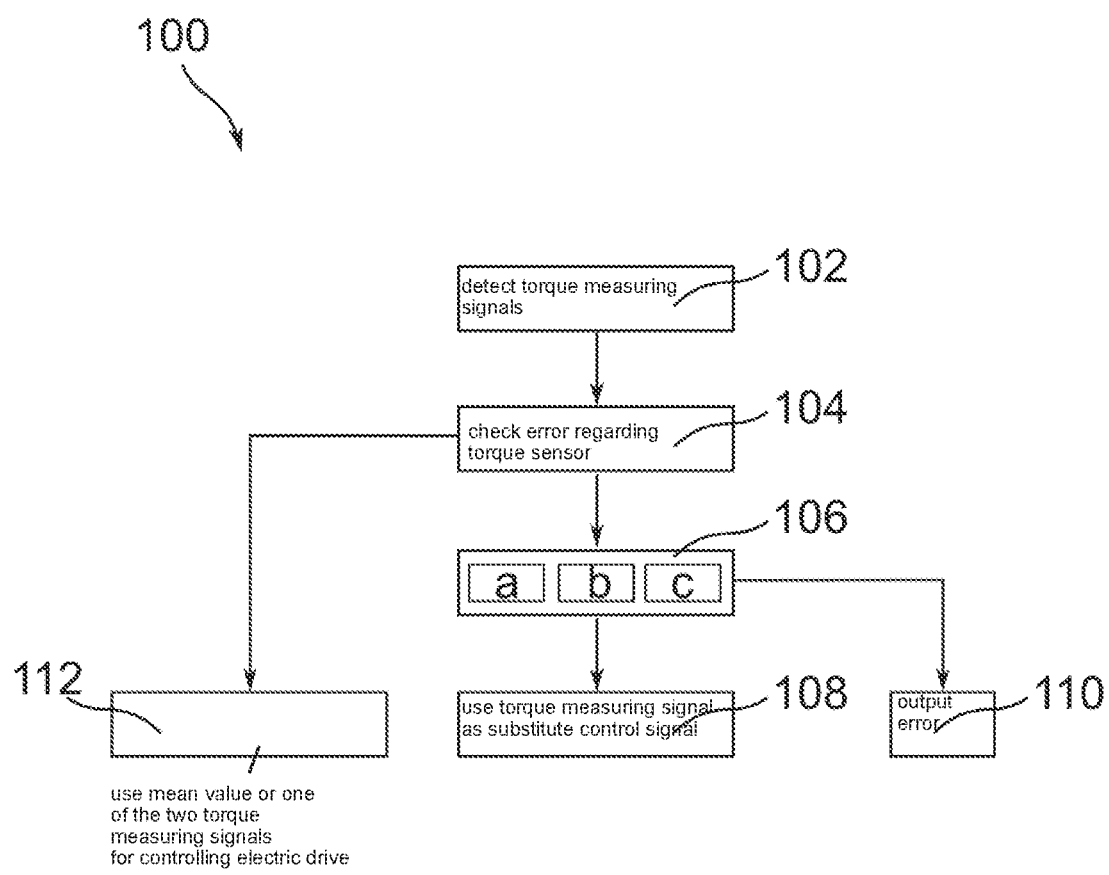
FIG. 2 shows a method diagram of one specific embodiment of the method according to the present invention.
Figure 3:
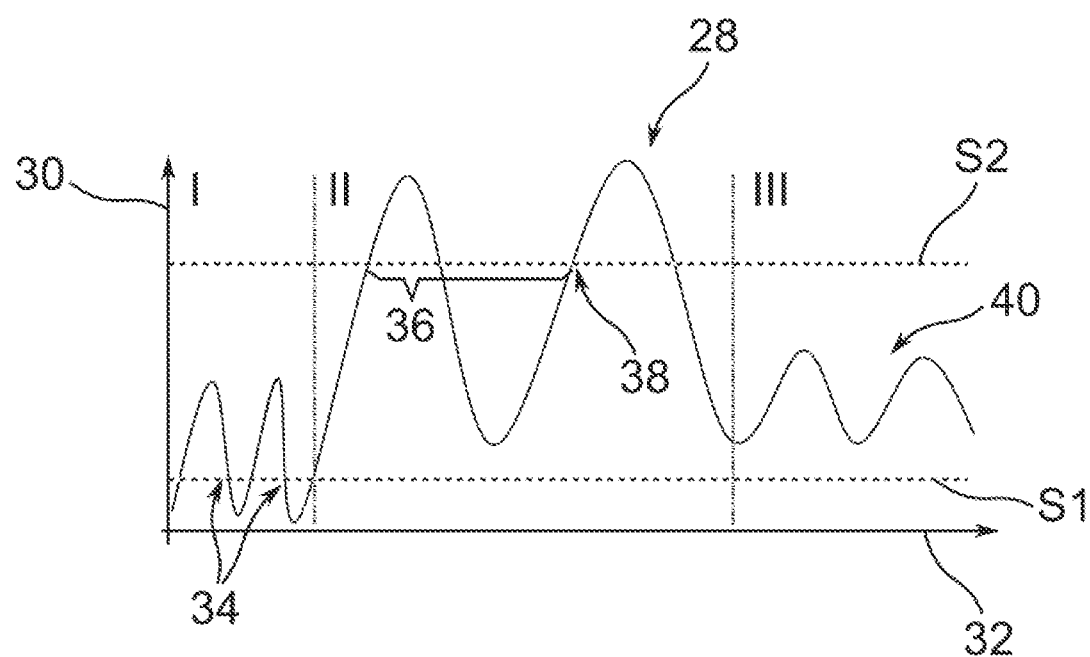
FIG. 3 shows an exemplary torque measuring signal profile.

FIG. 2 shows one exemplary embodiment of method 100 in a method diagram, which is explained hereafter in synopsis with an exemplary signal profile of a torque measuring signal, as shown in FIG. 3 (in the process, the signal shown in FIG. 3 may represent both an individual torque measuring signal 28 or also a previously averaged torque measuring signal 28). In a first method step 102, a multitude of torque measuring signals 28, in the example here two torque measuring signals 28, are detected with the aid of a torque sensor (not shown in greater detail) at crank mechanism 12. In method step 104, an error regarding the torque sensor and/or regarding at least one of torque measuring signals 28 is checked. If an error is present (for example an unexpectedly high noise level), it is attempted in method step 106 to recognize at least one torque measuring signal 28 as plausible. In the process, a torque measuring signal 28 is recognized as plausible in case (a) when the mean value of the two torque measuring signals 28 regularly falls below a first threshold value S1 of (here, by way of example) 5 Nm. As an alternative, in case (b), a torque measuring signal 28 is recognized as plausible when one of the two torque measuring signals 28, in particular, the smaller one, regularly falls below this first threshold value S1. This is shown in FIG. 3, section I, in which an exemplary rider torque 30 is plotted against time 32, which in reference numeral 34 falls below threshold value S1. As an alternative, in case (c), one of the two torque measuring signals 28 is recognized as plausible when it does not fall below first threshold value S1 and regularly crosses (i.e., exceeds or below) a second threshold value S2 of (here, by way of example) 30 Nm, it additionally having a periodicity 36 during crossing which essentially corresponds to the periodicity of a pedaling frequency of the rider. This is shown in FIG. 3, section II, in which threshold value S2 is exceeded or fallen below in reference numeral 38. If, in method step 106, one of torque measuring signals 28 was recognized as plausible, this torque measuring signal 28 is used as a substitute control signal for electric drive 16 in method step 108. If, in contrast, none of conditions (a) through (c) was met, and accordingly no plausible torque measuring signal 28, but an implausible torque measuring signal 40 was recognized (cf. illustration of FIG. 3, section III), an error is output in method step 110 to the rider of vehicle 10, here electric bicycle 10a.

Method step 112 identifies the case that the mean value of the two torque measuring signals 28, or of one of the two torque measuring signals 28, is used for controlling electric drive 16 after, in method step 104, no error regarding the torque sensor and/or regarding at least one of torque measuring signals 28 was recognized.

Figure 4:
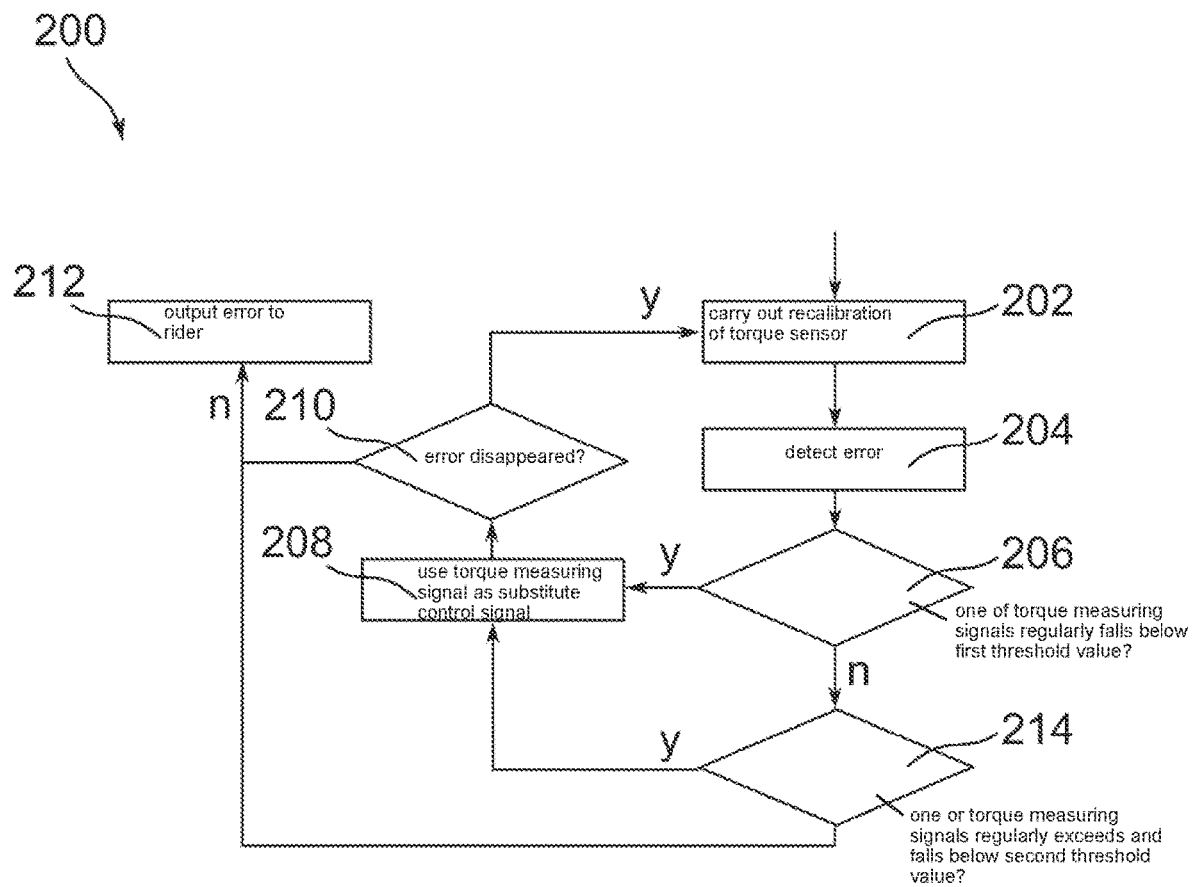
FIG. 4 shows an expanded method diagram of one specific embodiment of the method according to the present invention.

FIG. 4 shows an expanded method 200 as a flowchart. The method proceeds from a state of normal driving 202 in which electric drive 16 is activated using the (here, by way of example) two torque measuring signals 28. In method step 204, an error regarding the torque sensor and/or regarding at least one of torque measuring signals 28 is detected. Thereupon, it is initially checked in method step 206 whether one of torque measuring signals 28 regularly falls below first threshold value S1. If, during the check in method step 206, one of torque measuring signals 28 regularly exceeds first threshold value S1 (case y), in method step 208 the corresponding torque measuring signal 28 is utilized as a substitute control signal for activating electric drive 16. It is then checked, in method step 210, whether the error from method step 204 has disappeared again after a certain time or distance. If this is the case (y), a recalibration of the torque sensor is carried out, and a transition back into the initial state—the state of normal driving 202—takes place. If the error continues to exist (n), in method step 212 an error is output to the rider of vehicle 10, in particular, electric bicycle 10a. If, during the check in method step 206, one of torque measuring signals 28 does not regularly exceed first threshold value S1 (case n), it is checked in method step 214 whether one of torque measuring signals 28 regularly exceeds and falls below (i.e., crosses) second threshold value S2. If this is the case (y), the corresponding torque measuring signal 28 is utilized as a substitute control signal to activate electric drive 16. It is then also checked in this loop whether the error from method step 204 has disappeared again after a certain time or distance. If this is the case (y), a recalibration of the torque sensor is carried out, and a transition back into the initial state—the state of normal driving 202—takes place. If the error continues to exist (n), in method step 208 an error is output to the rider of vehicle 10, in particular, electric bicycle 10a. If, during the check in method step 214, one of torque measuring signals 28 does not regularly exceed and fall below second threshold value S2 (case n), in method step 208 an error is directly output to the rider of vehicle 10, here electric bicycle 10a.

What is claimed is:

1. A method for operating a vehicle operable by motor power and/or pedal power, the vehicle being an electric bicycle and including an electric drive, a crank mechanism, at least one torque sensor, which is configured to detect a torque applied by a rider onto the crank mechanism in the form of a multitude of torque measuring signals, and a control unit, the method comprising the following steps:

generating, by the control unit, a control signal for activating the electric drive as a function of at least one of the torque measuring signals; and during detection of an error regarding the torque sensor regarding a torque measuring signal, generating the control signal in the form of a substitute control signal based on at least one of the torque measuring signals when the at least one torque measuring signals is recognized as plausible.

2. The method as recited in claim 1, wherein a mean value of the torque measuring signals is recognized as plausible and used as the substitute control signal when a value of the torque measuring signals regularly falls below a first threshold value.

3. The method as recited in claim 2, wherein a torque measuring signal is only recognized as plausible and used as the substitute control signal when it is recognized as being similar to a sinusoidal signal.

4. The method as recited in claim 2, wherein the threshold value is selected as a value of a shut-off threshold of the electric drive.

5. The method as recited in claim 1, wherein a smallest of the torque measuring signals is recognized as plausible and used as the substitute control signal when the smallest of the torque measuring signals regularly falls below a first threshold value.

6. The method as recited in claim 1, wherein a smallest of the torque measuring signals is recognized as plausible and used as the substitute control signal when the smallest of the torque measuring signals does not fall below a first threshold value, and regularly exceeds and falls below a second threshold value.

7. The method as recited in claim 1, wherein a torque measuring signal is only recognized as plausible and used as the substitute control signal when, it has a periodicity with which it regularly exceeds and falls below first threshold value and/or second threshold value, the periodicity corresponding to a pedaling frequency of the rider.

8. The method as recited in claim 7, wherein the periodicity is ascertained during a predefined time period and/or in a predefined number of pedal revolutions acting on the crank mechanism from the torque measuring signal.

9. The method as recited in claim 7, wherein the first threshold value and/or the second threshold value includes a hysteresis.

10. A vehicle operable by motor power and/or pedal power, the vehicle being an electric bicycle, the vehicle comprising:
an electric drive;
a crank mechanism;
at least one torque sensor configured to detect a torque applied by a rider onto the crank mechanism in the form of a multitude of torque measuring signal; and
a control unit configured to activate the electric drive as a function of at least one of the torque measuring signals, wherein during detection of an error regarding the torque sensor regarding a torque measuring signal, the control unit being configured to generate the control signal in the form of a substitute control signal based on at least one of the torque measuring signals when the at least one torque measuring signals is recognized as plausible.

* * * * *